US009639951B2

(12) United States Patent
Salahat et al.

(10) Patent No.: US 9,639,951 B2
(45) Date of Patent: May 2, 2017

(54) OBJECT DETECTION AND TRACKING USING DEPTH DATA

(71) Applicant: Khalifa University Of Science, Technology & Research, Abu Dhabi (AE)

(72) Inventors: Ehab Najeh Salahat, Abu Dhabi (AE); Hani Hasan Mustafa Saleh, Abu Dhabi (AE); Safa Najeh Salahat, Abu Dhabi (AE); Andrzej Stefan Sluzek, Abu Dhabi (AE); Mahmoud Al-Qutayri, Abu Dhabi (AE); Baker Mohammad, Abu Dhabi (AE); Mohammed Ismail Elnaggar, Abu Dhabi (AE)

(73) Assignee: KHALIFA UNIVERSITY OF SCIENCE, TECHNOLOGY & RESEARCH, Abu Dhabi (AE)

( * ) Notice: Subject to any disclaimer, the term of this patent is extended or adjusted under 35 U.S.C. 154(b) by 39 days.

(21) Appl. No.: 14/522,524

(22) Filed: Oct. 23, 2014

(65) Prior Publication Data
US 2016/0117830 A1 Apr. 28, 2016

(51) Int. Cl.
G06K 9/00 (2006.01)
G06T 7/00 (2017.01)
G06T 7/20 (2017.01)
(52) U.S. Cl.
CPC .......... *G06T 7/0097* (2013.01); *G06T 7/0081* (2013.01); *G06T 7/204* (2013.01); *G06T 2207/10028* (2013.01); *G06T 2207/20148* (2013.01)

(58) Field of Classification Search
None
See application file for complete search history.

(56) References Cited

U.S. PATENT DOCUMENTS

| | | | | |
|---|---|---|---|---|
| 6,677,948 B1 * | 1/2004 | Wasserman | ............. | G06T 5/002 345/428 |
| 8,108,119 B2 * | 1/2012 | Southall | ................... | B60T 7/22 382/103 |
| 9,131,150 B1 * | 9/2015 | Mangiat | ............... | H04N 5/2352 |
| 9,224,060 B1 * | 12/2015 | Ramaswamy | ..... | G06K 9/00912 |
| 9,269,012 B2 * | 2/2016 | Fotland | ................ | G06K 9/3241 |
| 2005/0180627 A1 * | 8/2005 | Yang | .................. | G06K 9/00228 382/159 |

(Continued)

*Primary Examiner* — Iman K Kholdebarin
(74) *Attorney, Agent, or Firm* — Kilpatrick Townsend & Stockton LLP

(57) ABSTRACT

Methods and systems for detecting and/or tracking one or more objects utilize depth data. An example method of detecting one or more objects in image data includes receiving depth image data corresponding to a depth image view point relative to the one or more objects. A series of binary threshold depth images are formed from the depth image data. Each of the binary threshold depth images is based on a respective depth. One or more depth extremal regions in which image pixels have the same value are identified for each of the binary depth threshold images. One or more depth maximally stable extremal regions are selected from the identified depth extremal regions based on change in area of the one or more respective depth extremal regions for different depths.

20 Claims, 13 Drawing Sheets

(56) References Cited

U.S. PATENT DOCUMENTS

| | | | |
|---|---|---|---|
| 2006/0153450 A1* | 7/2006 | Woodfill | G06K 9/00791 382/173 |
| 2009/0067707 A1* | 3/2009 | Sim | G06K 9/00208 382/154 |
| 2010/0166258 A1* | 7/2010 | Chai | G06K 9/00375 382/103 |
| 2011/0044506 A1* | 2/2011 | Chen | G06T 7/0081 382/103 |
| 2013/0010066 A1* | 1/2013 | Olivier, III | B25J 9/1697 348/46 |
| 2014/0055560 A1* | 2/2014 | Fu | H04N 13/0022 348/42 |
| 2014/0168478 A1* | 6/2014 | Baheti | G06K 9/2081 348/240.99 |
| 2014/0286579 A1* | 9/2014 | Grujic | G06K 9/00986 382/203 |
| 2015/0043807 A1* | 2/2015 | Aliseychik | H04N 19/597 382/154 |
| 2015/0055821 A1* | 2/2015 | Fotland | G06K 9/3241 382/103 |
| 2015/0161474 A1* | 6/2015 | Jaber | G06K 9/52 382/203 |
| 2015/0228080 A1* | 8/2015 | Ge | G06T 7/0057 382/154 |
| 2015/0269740 A1* | 9/2015 | Mazurenko | G06T 7/0081 382/173 |
| 2015/0302592 A1* | 10/2015 | Bruls | G06T 7/0081 348/44 |
| 2015/0310624 A1* | 10/2015 | Bulan | G06T 7/2053 382/103 |
| 2016/0012597 A1* | 1/2016 | Wnuk | G06T 7/2033 382/103 |
| 2016/0026847 A1* | 1/2016 | Vugdelija | G06K 9/6218 382/103 |
| 2016/0070970 A1* | 3/2016 | Salahat | H04N 7/18 382/195 |
| 2016/0070975 A1* | 3/2016 | Salahat | G06K 9/4671 382/195 |
| 2016/0071280 A1* | 3/2016 | Salahat | G06K 9/00986 382/103 |
| 2016/0113546 A1* | 4/2016 | Salahat | A61B 5/055 600/410 |
| 2016/0117830 A1* | 4/2016 | Salahat | G06T 7/0081 382/154 |

* cited by examiner

OBJECT DETECTION AND TRACKING USING DEPTH DATA

BACKGROUND

Extracting affine-invariant regions and features from image data is used in numerous computer vision and robotic applications (e.g., image recognition and retrieval, mosaicing, three dimensional (3D) reconstruction, robot navigation, etc.) Such features have been tracked using corner detectors also used for stereo-matching and 3D vision-guided navigation. Affine-invariant feature detectors have become more sophisticated, both in terms of their invariance to scale changes and rotation and in terms of the complexity of supported applications image matching and retrieval instead of simple stereovision. Affine-invariant feature detectors have also been proposed to accurately handle the problem of perspective distortions.

An important aspect in feature detection is the ability of the detector to reliably find the same feature under different viewing conditions. One fairly reliable feature detection approach is the Maximally Stable Extremal Regions (MSER) approach proposed by Matas et al. MSER has become an industry standard due to its ability to find the same feature under different viewing conditions. Due to the relatively small number of regions per image, MSER is complementary to many common detectors and is well suited for large scale image retrieval. MSER has been used in a wide spectrum of computer vision applications (e.g., wide-baseline stereo, object recognition, image retrieval, tracking in temporal domain in consecutive frames, and 3D segmentation).

MSER has been shown to perform well as compared to other local detectors. MSER, however, is highly dependent on the intensity of incoming images. Accordingly, improved approaches and systems for reliably and efficiently identifying features in image data for use in object detection and/or object tracking remain of interest.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Methods and related systems are provided that process depth data to detect and/or track one or more objects. In many embodiments, depth data is processed in conjunction with corresponding image intensity data to identify the one or more objects. The depth data is processed to identify one or more "depth" maximally stable extremal regions (MSERs). Likewise, the image intensity data is processed to identify one or more "intensity" MSERs. One or more "strong" MSERs can be identified where respective one or more depth MSERs correspond to the same one or more areas for the identified intensity MSERs. The number of identified depth MSERs is often significantly less than the number of identified intensity MSERs. Accordingly, object identification and/or tracking using depth MSERs can help to increase reliability by decreasing the identification of extraneous image regions not corresponding to the object. The number of identified strong MSERs is often less than the number of identified depth MSERs. Accordingly, object identification and/or tracking using strong MSERs can further help to increase reliability by decreasing the identification of extraneous depth regions not corresponding to the object.

Thus, in one aspect, a method is provide for detecting one or more objects in image data. The method includes receiving depth image data corresponding to a depth image view point relative to the one or more objects. A plurality of binary threshold depth images are formed from the depth image data. Each of the binary threshold depth images is based on a respective depth. One or more depth extremal regions in which image pixels have the same value are identified for each of the binary depth threshold images. One or more depth maximally stable extremal regions are selected from the identified depth extremal regions based on change in area of one or more respective depth extremal regions for different depths.

The binary threshold depth images can be formed using intensity based depth image data. For example, the forming of the plurality of binary threshold depth images from the depth image data can include: a) converting the depth image data into its intensity image; and b) forming each of the binary threshold depth images from the depth image data intensity image based on a respective intensity.

The method can include generating parameters descriptive of the one or more depth maximally stable extremal regions. For example, such parameters can define an ellipse approximating the respective depth maximally stable extremal region.

In many embodiments, the method includes processing image intensity data along with the depth image data. For example, the method can further include: a) receiving intensity image data corresponding to an intensity image view point substantially the same as the depth image view point; b) forming a plurality of binary threshold intensity images from the intensity image data, each of the binary threshold intensity images being based on a respective intensity; c) for each of the binary intensity threshold images, identifying one or more intensity extremal regions in which image pixels have the same value; d) selecting one or more intensity maximally stable extremal regions from the identified intensity extremal regions based on change in area of one or more respective intensity extremal regions for different intensities; and e) selecting one or more strong maximally stable extremal regions that are both a depth maximally stable extremal region and an intensity maximally stable extremal region. In many embodiments, the depth image view point is the same as the intensity image view point.

The method can include generating parameters descriptive of the one or more strong maximally stable extremal regions. For example, such parameters can define an ellipse approximating the respective strong maximally stable extremal region.

In another aspect, a method is provided for tracking an object. The method includes receiving first depth image data corresponding to a first depth image view point relative to an object being tracked. A plurality of binary threshold first depth images are formed from the first depth image data. Each of the binary threshold first depth images is based on a respective depth. One or more first depth extremal regions in which image pixels have the same value are identified for each of the binary threshold first depth image. One or more first depth maximally stable extremal regions are selected from the identified first depth extremal regions based on change in area of one or more respective first depth extremal regions for different depths. Second depth image data corresponding to a second depth image view point relative to an object being tracked is received. A plurality of binary threshold second depth images are formed from the second depth image data. Each of the binary threshold second depth images is based on a respective depth. One or more second depth extremal regions in which image pixels have the same value are identified for each of the binary second depth threshold images. One or more second depth maximally stable extremal regions are selected from the identified second depth extremal regions based on change in area of one or more respective second depth extremal regions for different depths. An object is tracked based on the selected first and second depth maximally stable extremal regions by identifying one of the first depth maximally stable extremal regions and one of the second depth maximally stable regions corresponding to the object.

In many embodiments, the method for tracking an object further includes using intensity based image data. For example, the method can further include: a) receiving first intensity image data corresponding to a first intensity image view point substantially the same as the first depth image view point; b) forming a plurality of binary threshold first intensity images from the first intensity image data, each of the binary threshold first intensity images being based on a respective intensity; c) for each of the binary intensity first threshold images, identifying one or more first intensity extremal regions in which image pixels have the same value; d) selecting one or more first intensity maximally stable extremal regions from the identified first intensity extremal regions based on change in area of one or more respective first intensity extremal regions for different intensities; e) selecting one or more first strong maximally stable extremal regions that are both a first depth maximally stable extremal region and a first intensity maximally stable extremal region; f) receiving second intensity image data corresponding to a second intensity image view point substantially the same as the second depth image view point; g) forming a plurality of binary threshold second intensity images from the second intensity image data, each of the binary threshold second intensity images being based on a respective intensity; h) for each of the binary intensity second threshold images, identifying one or more second intensity extremal regions in which image pixels have the same value; i) selecting one or more second intensity maximally stable extremal regions from the identified second intensity extremal regions based on change in area of one or more respective second intensity extremal regions for different intensities; and j) selecting one or more second strong maximally stable extremal regions that are both a second depth maximally stable extremal region and a second intensity maximally stable extremal region. Tracking the object is based on the selected first and second strong maximally stable extremal regions by identifying one of the first strong maximally stable extremal regions and one of the second strong maximally stable regions corresponding to the object.

In another aspect, a system for detecting one or more objects in image data is provided. The system includes one or more processors and a tangible memory storage device storing instructions that when executed by the one or more processors cause the system to: a) receive depth image data corresponding to a depth image view point relative to the one or more objects; b) form a plurality of binary threshold depth images from the depth image data, each of the binary threshold depth images being based on a respective depth; c) for each of the binary depth threshold images, identify one or more depth extremal regions in which image pixels have the same value; and d) select one or more depth maximally stable extremal regions from the identified depth extremal regions based on change in area of one or more respective depth extremal regions for different depths.

The system can be configured to form the binary threshold depth images using intensity based depth image data. For example, the forming of the plurality of binary threshold depth images from the depth image data can include: a) converting the depth image data into its intensity image; and b) forming each of the binary threshold depth images from the depth image data intensity image based on a respective intensity.

The instructions can be configured to cause the system to generate parameters descriptive of the one or more depth maximally stable extremal regions. For example, the parameters can define an ellipse approximating the respective depth maximally stable extremal region.

In many embodiments, the instructions are configured to cause the system to process image intensity data along with the depth image data. For example, the instructions can be configured to cause the system to: a) receive intensity image data corresponding to an intensity image view point substantially the same as the depth image view point; b) form a plurality of binary threshold intensity images from the intensity image data, each of the binary threshold intensity images being based on a respective intensity; c) for each of the binary intensity threshold images, identify one or more intensity extremal regions in which image pixels have the same value; d) select one or more intensity maximally stable extremal regions from the identified intensity extremal regions based on change in area of one or more respective intensity extremal regions for different intensities; and e) select one or more strong maximally stable extremal regions that are both a depth maximally stable extremal region and an intensity maximally stable extremal region. In many embodiments, the depth image view point is the same as the intensity image view point.

The instructions can be configured to cause the system to generate parameters descriptive of the one or more strong maximally stable extremal regions. For example, the parameters can define an ellipse approximating the respective strong maximally stable extremal region.

In another aspect, a system is provided for tracking an object. The system includes one or more processors and a tangible memory storage device. The tangible memory storage device stores instructions that when executed by the one or more processors cause the system to: a) receive first depth image data corresponding to a first depth image view point relative to an object being tracked; b) form a plurality of binary threshold first depth images from the first depth image data, each of the binary threshold first depth images being based on a respective depth; c) for each of the binary threshold first depth images, identify one or more first depth extremal regions in which image pixels have the same value; d) select one or more first depth maximally stable extremal regions from the identified first depth extremal regions based on change in area of one or more respective first depth extremal regions for different depths; e) receive second depth image data corresponding to a second depth image view point relative to an object being tracked; f) form a plurality of binary threshold second depth images from the second depth image data, each of the binary threshold second depth images being based on a respective depth; g) for each of the binary second depth threshold images, identify one or more second depth extremal regions in which image pixels have the same value; h) select one or more second depth maximally stable extremal regions from the identified second depth extremal regions based on change in area of one or more respective second depth extremal regions for different depths; and i) track an object based on the selected first and second depth maximally stable extremal regions by identifying one of the first depth maximally stable extremal regions and one of the second depth maximally stable regions corresponding to the object.

In many embodiments, the instructions are further configured to process image intensity data in combination with the depth image data. For example, the instructions, when executed by the one or more processors, can cause the system to: a) receive first intensity image data corresponding to a first intensity image view point substantially the same as the first depth image view point; b) form a plurality of binary threshold first intensity images from the first intensity image data, each of the binary threshold first intensity images being based on a respective intensity; c) for each of the binary intensity first threshold images, identify one or more first intensity extremal regions in which image pixels have the same value; d) select one or more first intensity maximally stable extremal regions from the identified first intensity extremal regions based on change in area of one or more respective first intensity extremal regions for different intensities; e) select one or more first strong maximally stable extremal regions that are both a first depth maximally stable extremal region and a first intensity maximally stable extremal region; f) receive second intensity image data corresponding to a second intensity image view point substantially the same as the second depth image view point; g) form a plurality of binary threshold second intensity images from the second intensity image data, each of the binary threshold second intensity images being based on a respective intensity; h) for each of the binary intensity second threshold images, identify one or more second intensity extremal regions in which image pixels have the same value; i) select one or more second intensity maximally stable extremal regions from the identified second intensity extremal regions based on change in area of one or more respective second intensity extremal regions for different intensities; and j) select one or more second strong maximally stable extremal regions that are both a second depth maximally stable extremal region and a second intensity maximally stable extremal region. The object is tracked based on the selected first and second strong maximally stable extremal regions by identifying one of the first strong maximally stable extremal regions and one of the second strong maximally stable regions corresponding to the object.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which.

DETAILED DESCRIPTION

Figure 1:
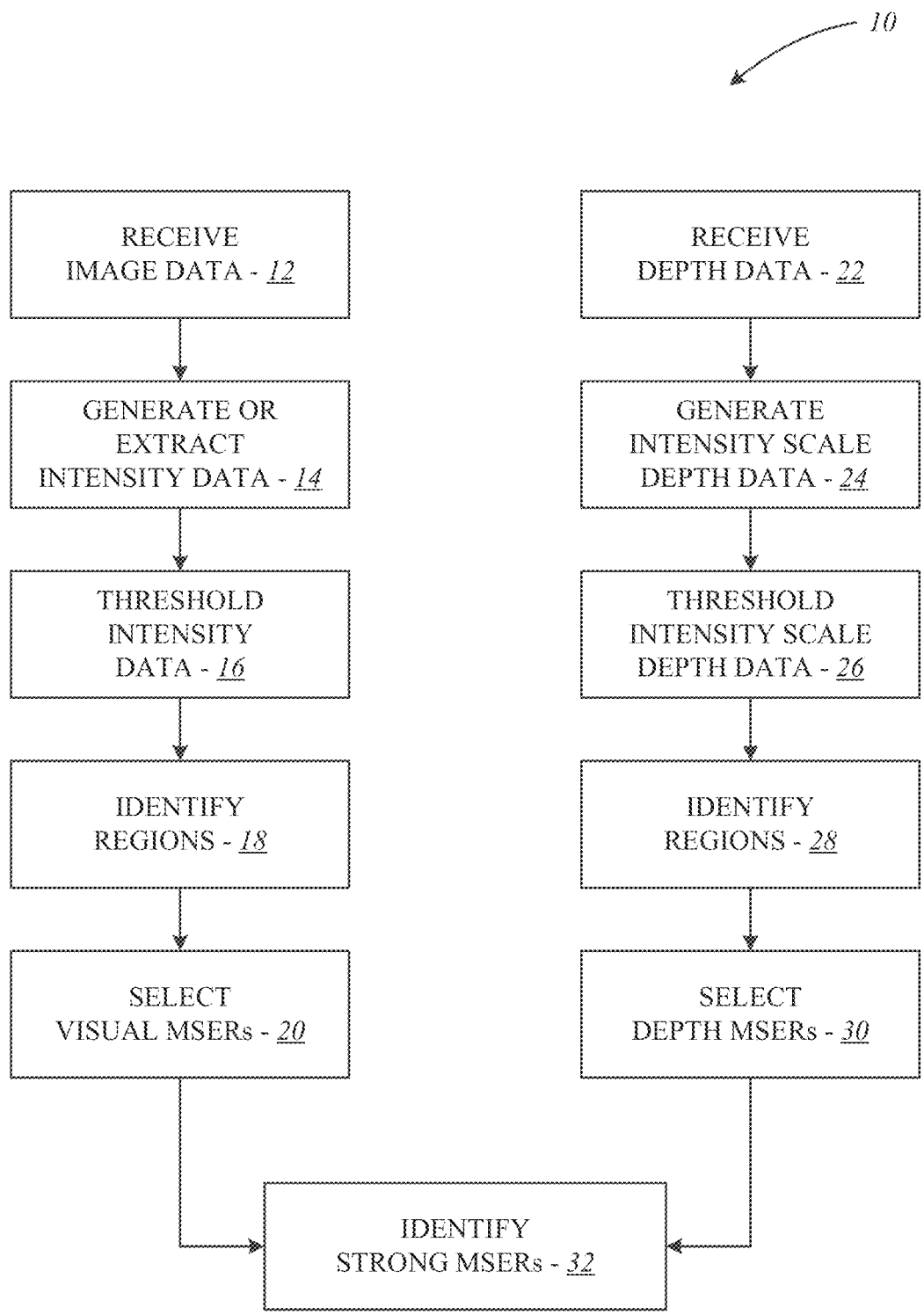
FIG. 1 is a simplified schematic diagram of an approach for detecting an object in depth data and corresponding image intensity data, in accordance with many embodiments.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Approaches and systems are provided that utilize depth data to detect and/or track one or more objects. In many embodiments, the depth data is processed in conjunction with image intensity data. For example, the approaches and systems provided can be used to process depth data from red-green-blue-depth images to detect or track one or more objects. The approaches and systems provided can be used to detect and/or track one or more objects in real-world scenarios and produce enhanced detection results. In many embodiments, what is referred to herein as a visual maximally stable extremal region(s) (MSER(s)) is detected by processing image intensity data and a depth MSER(s) is detected by processing corresponding depth data. What is referred to herein as a strong MSER(s) can be identified for a region that is both a visual MSER and a depth MSER. The approaches and systems provided detect an object(s) with enhanced repeatability and are suitable for real-time detection and tracking in real-life scenarios. The depth MSER(s) and/or strong MSER(s) can be represented using both visual key point descriptors and local feature descriptors for the depth data.

MSER Detection

The detection of one or more maximally stable extremal regions is described as follows. Starting with an M×N empty grid that corresponds to an M×N intensity image, all entries of the empty grid are initially set to the same first binary value (e.g., a value representing the color black). The resulting starting M×N grid (with all entries set to the first binary value) serves as a first of a series of what are referred to herein as binary threshold intensity images. The remaining of the series of binary threshold intensity images are generated by progressively varying an intensity threshold by a threshold increment delta ($\Delta$) from the minimum intensity to the maximum intensity used, for example, from 0 to 255 in steps equal to the threshold increment delta ($\Delta$). At each threshold, all pixels in the corresponding binary threshold intensity image corresponding to pixels in the intensity image with values that fall below the current threshold are assigned a second binary value (e.g., a value representing the color white) and the remaining pixels in the corresponding binary threshold intensity image are assigned the first binary value (e.g., a value representing the color black). As the threshold increases from the minimum intensity value to the maximum intensity value, some white regions will appear, some of the white regions will merge, and ultimately all of the white regions will merge to produce a totally white image at least when the threshold reaches the maximum intensity value. During this process, the size of each white region (i.e., its cardinality $Q(t)$) is monitored as a function of threshold value t. An MSER is detected if $q(t)$ defined in equation (1) below has a local minimum.

$$q(t)=[Q(t+\Delta)/Q(t-\Delta)]/Q(t) \quad \text{Equation (1)}$$

The detected MSERs in this case correspond to the white regions. For black MSERs, the inverted intensity image is used instead. The word 'extremal' refers to the property that all pixels inside the MSER have either higher (bright extremal regions) or lower (dark extremal regions) intensity than all the pixels on its outer boundary.

The MSER detection is controlled by four main parameters, namely the threshold increment $\Delta$, the minimum and maximum size of each region, and the maximum area variation defined by the stability function $q(t)$. There may be no optimal values for these four parameters. The lower the value of $\Delta$, the more accurate (but the slower) the algorithm becomes. Typically, $\Delta$ is selected in the range of 4 to 7 wherein the possible intensity values vary from 0 to 255.

Extended MSER Detection

As set forth herein, MSER detection is extended to detect the maximally stable extremal regions coming from a depth image, i.e. to detect those regions with a relatively small variation for changes in threshold depth, similar to the way in which MSER detection operates with an intensity image. In many embodiments, a depth image is converted into an intensity image where the intensity values are selected to represent the respective depth. A depth threshold is varied to generate a series of binary depth threshold images similar to the series of binary intensity threshold images described herein. The resulting growing extremal regions are monitored to identify depth MSERs, based on the definition of the stability function and the MSER detection parameters described above. Intensity images result in what is referred to herein as visual MSERs. Depth images result in what is referred to herein as depth MSERs.

Referring now to the drawings, in which like reference numerals represent like parts throughout the several views, FIG. 1 shows a method 10 for detecting and/or tracking one or more objects using depth data and corresponding image intensity data, in accordance with many embodiments. The method 10 includes receipt of image data (act 12). A two-dimensional array of intensity values is generated or otherwise extracted from the image data (act 14). The intensity values are then used to generate a plurality of binary intensity threshold images as described herein (act 16). Extremal regions in the binary intensity threshold images are identified as described herein (act 18). The identified extremal regions are monitored to identify visual MSERs as described herein (act 20).

In a similar manner as with regard to the received image data, the method 10 includes receipt of depth data (e.g., a depth image) (act 22). A two-dimensional array of intensity values is generated to represent the depth data (act 24). The intensity values are then used to generate a series of binary depth threshold images as described herein (act 26). Extremal regions in the binary depth threshold images are identified as described herein (act 28). The identified extremal regions are monitored to identify depth MSERs as described herein (act 30). Regions that qualify as both a visual MSER and a depth MSER can be identified as what is referred to herein as a strong MSER (act 32).

Figure 2A:
FIG. 2A is an example image used to test the approach of FIG. 1.
Figure 2B:
FIG. 2B is an intensity image for the example image of FIG. 2A.
Figure 2C:
FIG. 2C is an inverted intensity image for the intensity image of FIG. 2B.
Figure 2D:
FIG. 2D is an intensity-based depth image for the example image of FIG. 2A.
Figure 3:
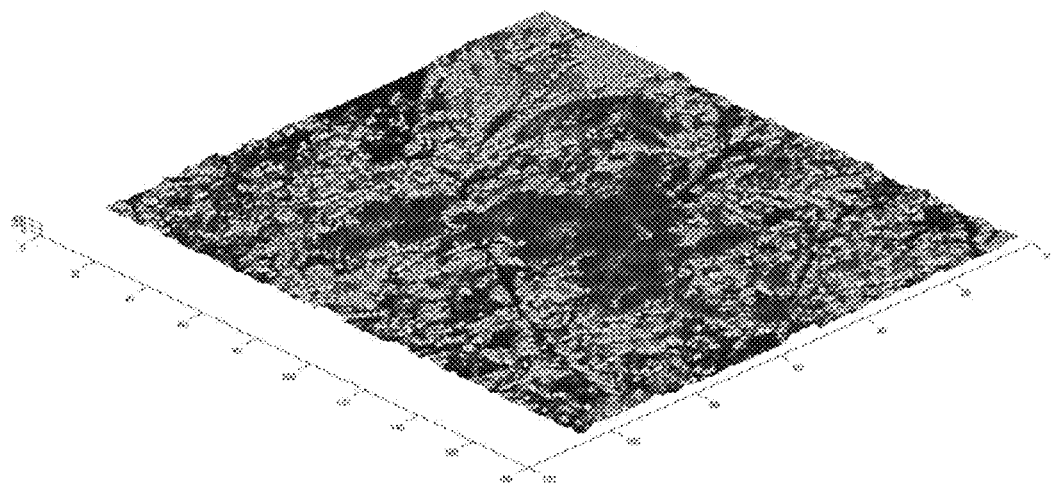
FIG. 3 is a three-dimensional view of intensity values for the intensity image of FIG. 2B.
Figure 4:
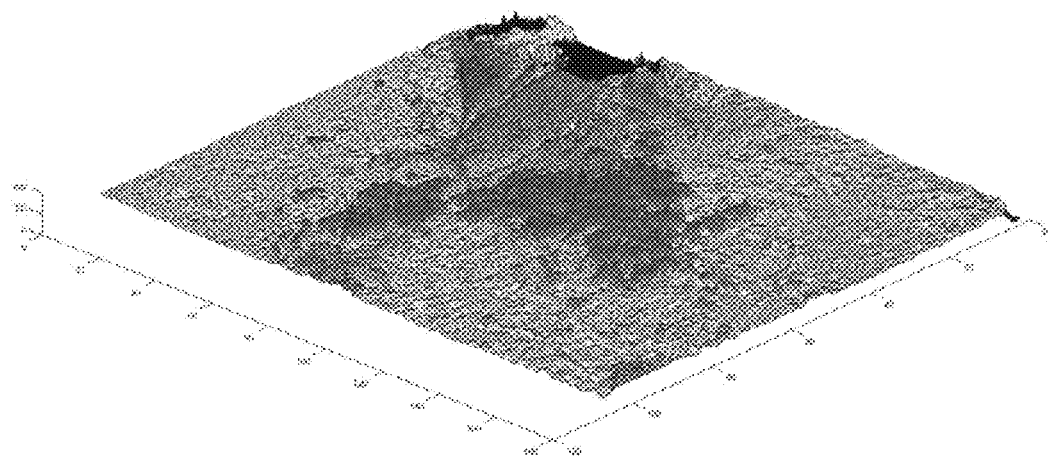
FIG. 4 is a three-dimensional view of intensity values for the intensity-based depth image of FIG. 2D.

FIG. 2A is an example image used to test the approach of FIG. 1. FIG. 2B is an intensity image for the example image of FIG. 2A. FIG. 2C is an inverted intensity image for the intensity image of FIG. 2B. FIG. 2D is an intensity-based depth image for the example image of FIG. 2A. FIG. 3 is a three-dimensional (3D) view of intensity values for the intensity image of FIG. 2B. FIG. 4 is a 3D view of intensity values for the intensity-based depth image of FIG. 2D. FIG. 3 and FIG. 4 illustrate a comparison of the 3D view of the intensity and depth images of the example image. It can be seen that some parts of the 3D view are almost the same, while some others are not. As a result, strong MSERs can be detected that are both visual and depth MSERs. And some other MSERs will only be detected as either a depth MSER or a visual MSER. Strong MSERs are the MSERs of the depth and the intensity images with similar shapes and locations, assuming the same MSER detection parameters being used.

Since depth images are likely to be less detailed as compared to intensity images, detection of the depth MSERs is much faster, less hardware demanding, and more convenient to handle for real-time object recognition and tracking. This indicates that depth images usually span over much smaller ranges of values than the intensity images. This also means that the algorithm can be initiated from the minimum depth value up to the maximum depth and does not necessarily need to start from 0 and end at 255 while monitoring the identified extremal regions of the series of binary depth threshold images to identify the depth MSERs.

The use of depth MSERs in detecting and/or tracking an object helps to compensate for problems that can arise when using visual MSERs alone. For example, the use of visual MSERs may be sufficient as long as the detection environment remains stable or at least slowly changing. A sudden change in the conditions of the detection environment (e.g., a car being tracked by a helicopter in a sunny street and suddenly entering a shaded city), however, may cause loss of tracking continuity, especially with complex backgrounds. Accordingly, in such a scenario, the use of depth MSERs may ensure continued tracking of the car as the depth (range) between the car and the helicopter remains relatively constant.

As described herein, a detected MSER can be fitted with an ellipse to represent the MSER for the sake of visualization. In addition, many feature descriptors process the elliptical approximation parameters (major/minor axis length, center of gravity and orientation angle) of these regions rather than the regions themselves. The elliptical approximation can be easily obtained using region area moments. Using such elliptical approximations, strong MSERs can be defined as pairs of visual and depth MSERs with nearly identical elliptical approximations.

Table 1 below presents the number of visual MSERs, depth MSERs, and strong MSERs identified using the approach described herein for the example intensity image of FIG. 2B and the example depth image of FIG. 2D. As can be clearly seen from Table 1, the number of each of the depth MSERs and the strong MSERs is far less than that of the visual MSERs. This fact shows that the extended MSER detector is an excellent candidate for object detection and tracking in real-time scenarios. Additionally, the extended MSER detector can be used with intensity image description algorithms as well as those specifically designed for depth images.

TABLE I

EXTENDED MSER DETECTOR STATISTICS

| Image | Visual | Depth | Strong | Total MSERs |
|---|---|---|---|---|
| A | 134 | 39 | 23 | 134 + (39 − 23) = 150 |
| B | 206 | 54 | 21 | 206 + (54 − 21) = 239 |
| C | 258 | 118 | 33 | 258 + (118 − 33) = 343 |

Figure 5:
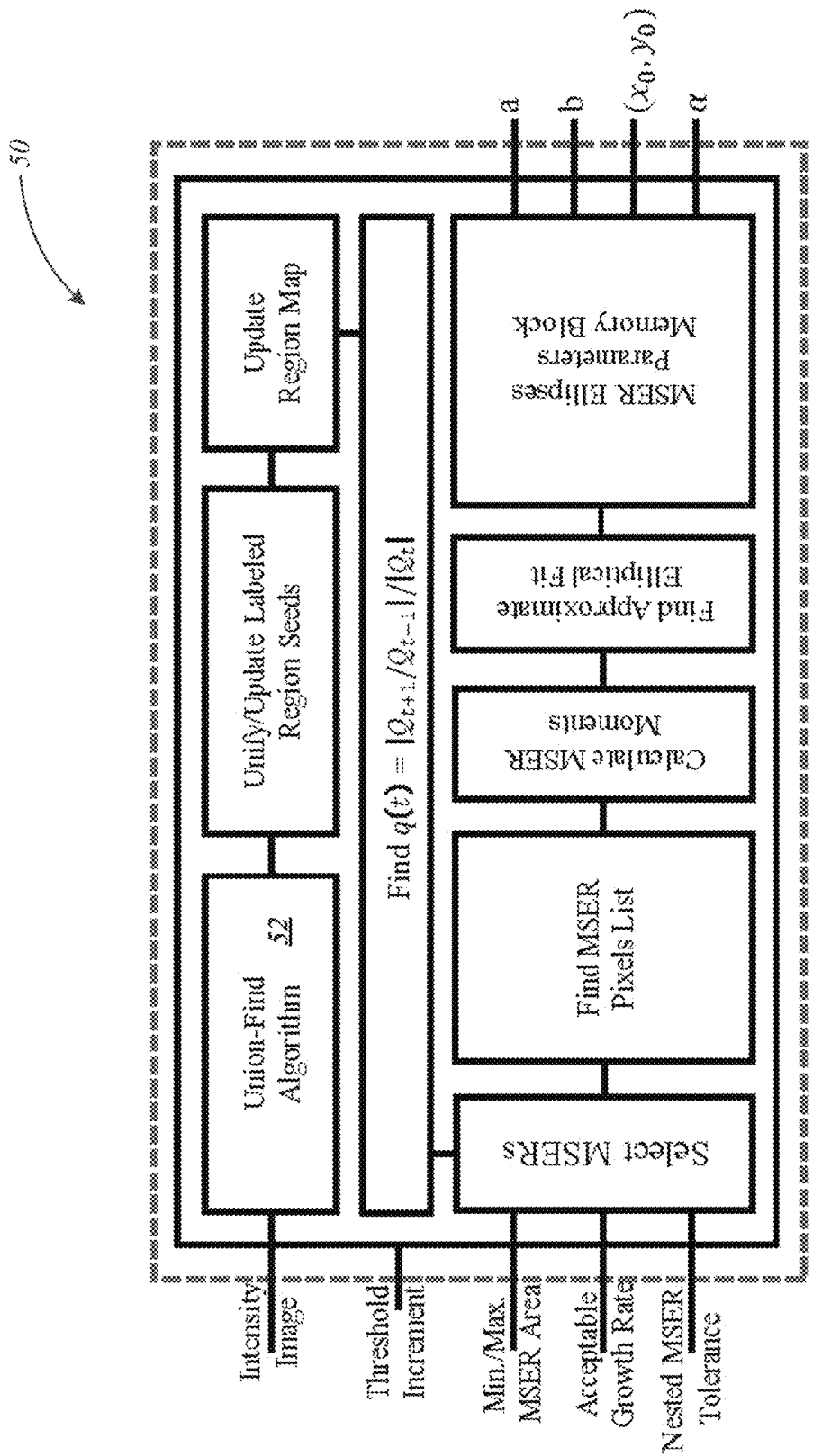
FIG. 5 is a simplified schematic diagram illustrating an approach for processing image intensity data and intensity-based depth data to detect one or more objects, in accordance with many embodiments.

FIG. 5 illustrates a method 50 for MSER detection, in accordance with many embodiments. The method 50 includes the use of an efficient Union-Find algorithm 52 to label each of the extremal regions at each threshold. In the method 50, there are four main parameters that control the detection of the MSERs, namely the maximum and minimum allowable number of pixels of the MSER, the maximum allowable growth rate specified by the stability function, the threshold increment, and the nesting tolerance. Different choices of those parameters yield different detected MSERs. The first two parameters (MinArea and MaxArea) are used to exclude too small or too large MSERs, i.e., all detected MSERs satisfy the condition set forth in equation (2).

$$\text{MinArea} \leq Q \leq \text{MaxArea} \quad \text{Equation (2)}$$

The third parameter, the Maximum Acceptable Growth Rate, specifies how stable the detected MSERs should be, i.e., all detected MSERs must satisfy the condition set forth in equation (3).

$$q(t)=[Q(t+\Delta)/Q(t-\Delta)]/Q(t) \leq \text{MaxGrowth} \quad \text{Equation (3)}$$

The final parameter, the Nesting Tolerance Value, is used to resolve the weaknesses of the MSERs. Since nested MSERs have almost the same center coordinates, any new MSER with its center in the range specified by the tolerance value compared to previously detected and stored MSER will be excluded automatically, i.e., all detected MSERs satisfy the conditions set forth in equation (4) and equation (5).

$$x_0 \notin \{(1-0.5\tau)x_i,(1+0.5\tau)x_i\}. \quad (4)$$

$$y_0 \notin \{(1-0.5\tau)y_i,(1+0.5\tau)y_i\}. \quad (5)$$

$\tau$ refers to the tolerance value, and $x_i$ and $y_i$ denotes all previously stored center values of the detected MSERs. This approach, even though relatively simple, has a major drawback, which is the unnecessary computation needed for the calculation of image moments. To predict possible nesting, and hence save all those unnecessary operations, as an alternative approach with far much lower computational cost, for each region, the current growth rate can be compared to the previous growth rate, and if absolute difference is within some range, defined again by the tolerance parameter $\tau$, then this region at the current threshold can be excluded from MSER detection processing. Finally, the threshold increment, $\Delta$, can be selected as 5 to speed up the MSER detection process. Approximately, MSER detection with $\Delta$ equals to 5 is five times faster than when $\Delta$ equals to 1. Finally, since merged regions have the same growth rate from the threshold level they merge and afterwards, only one MSER, corresponding to the region with the seed that comes first in the SeedList is detected and the rest not processed and ignored. This alternative approach saves reduces the number of computations, and hence time and power. The full MSER algorithm implementation consists, therefore, of the following main stages: a) thresholding, b) labeling, c) unifying/updating regions seeds, d) updating region map, e) selection of MSERs, f) MSER pixels, moments, and ellipse parameters, and g) store MSER elliptical fit parameters.

A. Thresholding

The incoming frame (intensity image) is thresholded, starting with threshold of value zero with $\Delta$ increments up till 255, i.e., each frame requires 255/$\Delta$+1 thresholding (e.g. for $\Delta$ equals to 5, 52 thresholding processes are required for each frame.

B. Labeling

The Union-Find algorithm 52 is used to label the binary image. The algorithm will output the labeled image, the seed, and the size (the number of pixels with the same label) of each region, plus the number of labels used, respectively referred to as ID, Seeds, SeedsRS, and NumSeeds.

C. Unifying/Updating Region Seeds

This is step is necessary for the system to work properly due to the following rationale. The Union-Find algorithm returns labeled regions and their corresponding sizes and seeds. The seed of each region at this threshold is the first pixel location that the algorithm encounters of every region. Next, due to the threshold increment, previous regions might grow or even merge and new regions might appear. This means that the Union-Find will label those regions with labels, still unique but not necessarily similar to previous labels or with the same seeds. More importantly, since the regions grow/merge, the first pixel location that the Union-Find encounters for the growing region, i.e. its current seed, will be definitely different from the previous seed, even though both refer to the same region. Obviously, for those growing regions, the seed, i.e. first detected pixel of every connected component set, is likely to be different from that at the previous threshold, even though both refer to the same region. To overcome this issue, all seeds that get stored at this threshold, in the Seeds memory, are compared with the seeds previously detected and stored in the SeedList. This is simply done by comparing the labels, stored in ID, at the locations specified by the Seeds at the current threshold, and the stored SeedList. If a match is found, the old seed is maintained, otherwise a new seed is appended to the SeedsList.

D. Updating Region Map

The region map is a dedicated memory that is used to store the seeds' region sizes, consisting of 3×#seeds stored in the SeedList registers, to store the value of [Q(t+Δ)], [Q(t)], and [Q(t−Δ)] for each seed; the values are needed to calculate the stability function for each seed in the SeedList. This is done (for memory reduction and efficiency) instead of recording the region size for every seed in the SeedList at every threshold. With this, if more seeds are appended to the SeedList at threshold t+Δ, then new locations for this new seed are also appended to the RegionMap, where the region size for this threshold is added in the [Q(t+Δ)] while [Q(t)], and [Q(t−Δ)] are filled with ones (to avoid division by zero). Note that since [Q(t+Δ)] is not available at the current threshold t, nor is available for the first threshold, then the calculation of (1) starts at the third threshold, i.e., q(t) is calculated at threshold t+Δ, excluding the first and final threshold values. In this way, the stability function can be easily calculated and this is the reason for the RegionMap memory to have three rows. To elaborate on this, consider the following sample scenario presented in Table 2 below. At the third threshold, in Table 2, q(t) is calculated for the second threshold. At [Q(t)], the two regions defined by Seed#1 and Seed#2 merge, so they have the same size from now on. At the fourth threshold, in Table 2, q(t) is calculated for the third threshold, and note that [Q(t+Δ)] and [Q(t)] at the third threshold are [Q(t)] and [Q(t−Δ)] at the fourth threshold. Because of the detection of a new region, defined by Seed#5, RegionMap list is appended and the size of this new region at [Q(t+Δ)] is filled with its size, while [Q(t)], and [Q(t−Δ)] are filled with ones. At this threshold, regions referred to by Seed#3 and Seed#4 merge so they will have the same region size from now on, etc. Note that at the final threshold, all regions will merge into one with a size M×N.

TABLE 2

Example SeedList and RegionMap Scenario (a) At the third threshold.

| SeedsList | Seed#1 | Seed#2 | Seed#3 | Seed#4 | blank |
|---|---|---|---|---|---|
| |Q(t − Δ)| | 25 | 49 | 102 | 4 | blank |
| |Q(t)| | 120 | 120 | 135 | 11 | blank |
| |Q(t + Δ)| | 155 | 155 | 173 | 44 | blank |

(b) At the fourth threshold

| SeedsList | Seed#1 | Seed#2 | Seed#3 | Seed#4 | Seed#5 |
|---|---|---|---|---|---|
| |Q(t − Δ)| | 120 | 120 | 135 | 11 | 1 |
| |Q(t)| | 155 | 155 | 173 | 44 | 1 |
| |Q(t + Δ)| | 203 | 203 | 244 | 244 | 13 |

E. Selection of MSERs

At this stage, using q(t) previously calculated, in conjunction with [Q(t)] stored in RegionMap, MSERs are selected to satisfy the conditions (2)-(5).

F. MSER Pixels, Moments, and Ellipse Parameters

For every MSER that satisfies the condition in (2)-(5), the Pixels List, i.e., the x and y coordinates for the labeled region, stored in ID, and defined by its seed stored in the SeedList, are used these to calculate the region moments per equation (6).

$$m_{pq} = \Sigma_{\{x,y\} \in R} x^p y^q, \quad x,y \in \mathcal{R}(\tau) \quad (6)$$

x and y denote the pixel coordinates of the region $\mathcal{R}(\tau)$ at the current threshold. Subsequently, the region can be approximated by the best-fit ellipse. The ellipse equation is given by equation (7).

$$\frac{(x - x_0 + \tan(\alpha)(y - y_0))^2}{a^2(1 + \tan^2(\alpha))} + \frac{(y - y_0 + \tan(\alpha)(x - x_0))^2}{b^2(1 + \tan^2(\alpha))} = 1, \quad (7)$$

$(x_0, y_0)$, a, b, and α are the center of gravity (center of the ellipse), the major and minor axis lengths and the angle with respect to the horizontal axis. These ellipse parameters can be calculated from the region moments m00, m01, m10, m11, m02, and m20 as set forth in equation (8) through equation (15).

$$x_0 = \frac{m_{10}}{m_{00}}, \quad (8)$$

$$y_0 = \frac{m_{01}}{m_{00}}, \quad (9)$$

$$a = \sqrt{2\left(t_1 + t_3 + \sqrt{t_2^2 + (t_3 - t_1)^2}\right)}, \quad (10)$$

$$b = \sqrt{2\left(t_1 + t_3 - \sqrt{t_2^2 + (t_3 - t_1)^2}\right)}, \quad (11)$$

$$\alpha = 0.5 \tan^{-1}\left(\frac{t_2}{t_1 - t_3}\right), \quad (12)$$

where $$t_1 = \frac{m_{20}}{m_{00}} - x_0^2, \quad (13)$$

$$t_2 = 2\left(\frac{m_{11}}{m_{00}} - x_0 y_0\right), \quad (14)$$

$$t_3 = \frac{m_{02}}{m_{00}} - y_0^2, \quad (15)$$

Figure 9:
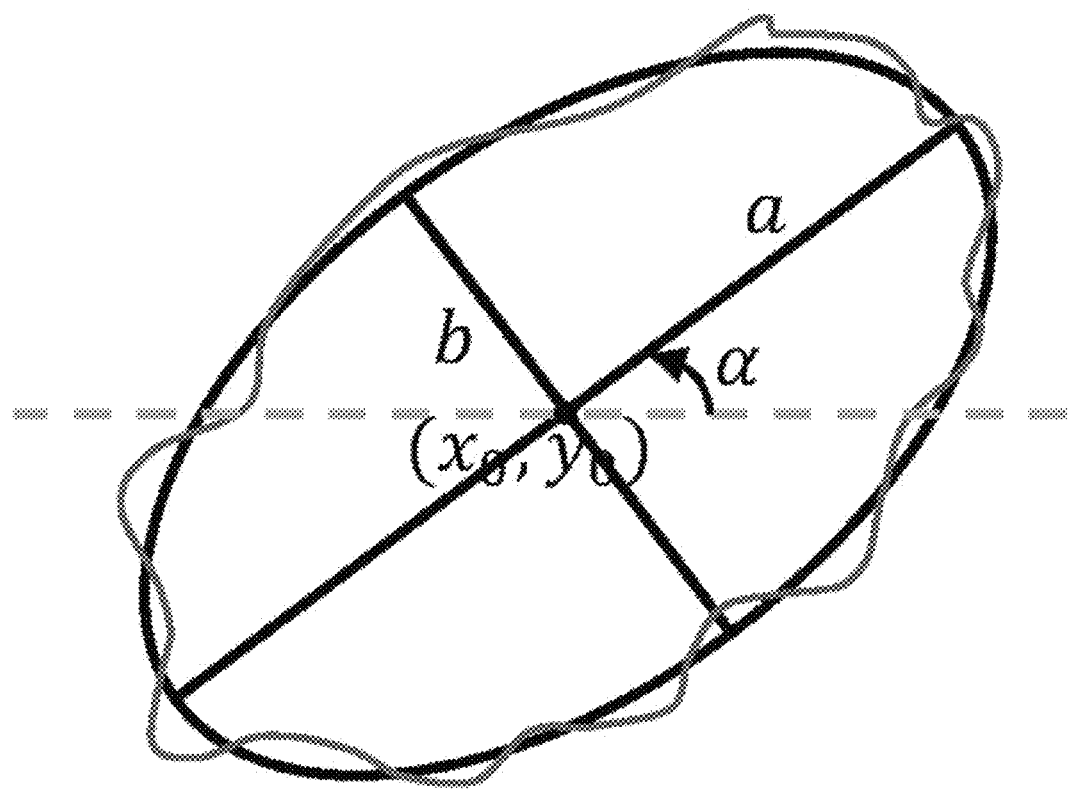
FIG. 9 illustrates elliptical approximation of a depth and intensity based maximally stable extremal region, in accordance with many embodiments.

A sample sketch for an irregularly shaped region and its best fit elliptical approximation is shown in FIG. 9. Note that since regions merge will cause the same region sizes to be stored for multiple seeds, which means that if an MSER is detected, multiple detections referring to the same MSER may occur. To avoid this, only the first seed for the merged regions is considered, as discussed above.

G. Store MSER Elliptical Fit Parameters

Finally, instead of storing each MSER Pixels List, which will require a huge memory, parameters of the best-fit ellipses ($x_0$, $y_0$, α, a, and b) are stored to be displayed or further monitored. In fact, it's noteworthy that since the elliptical fit parameters are available, they can be used to compute SURF or SIFT descriptors. Depending on the version of the intensity image used, the detector will either detect bright or dark MSERs.

Figure 10:
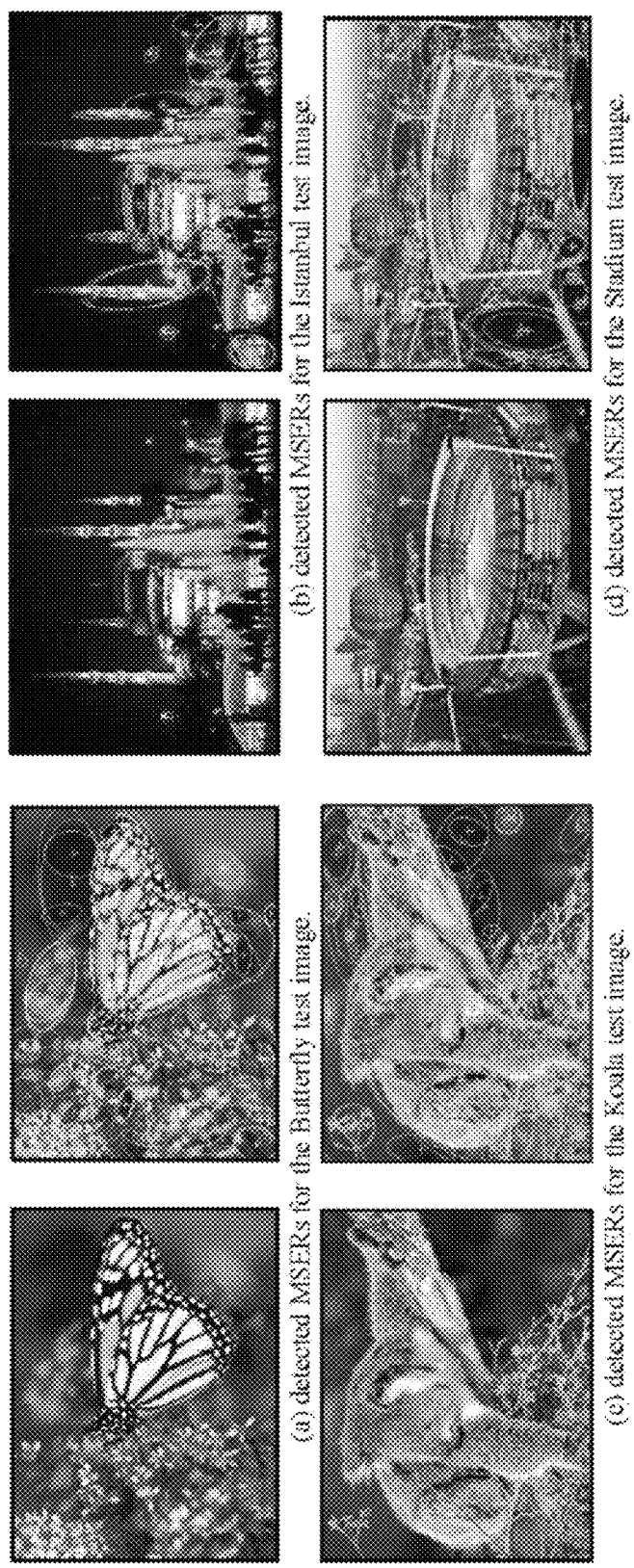
FIG. 10 includes sample test images and resulting detected depth and intensity based maximally stable extremal regions in the sample test images, in accordance with many embodiments.

Several test scenarios were conducted, detecting both bright and dark MSERs. Sample images with their MSERs are shown in FIG. 10. The test resolution is 160×120. The threshold increment, Δ, used was 5. The minimum and maximum region areas, MinArea and MaxArea, values used were 10 and 1000 pixels, respectively. The nesting tolerance, τ, used was 0.5. The nesting can be minimized by increasing the value of τ so that more MSERs with close centroids are excluded. Different values of these parameters will yield, of course, slightly differently detected MSERs. In FIG. 10, it can be seen that the ellipses actually enclose both bright and dark MSERs.

Figure 6:
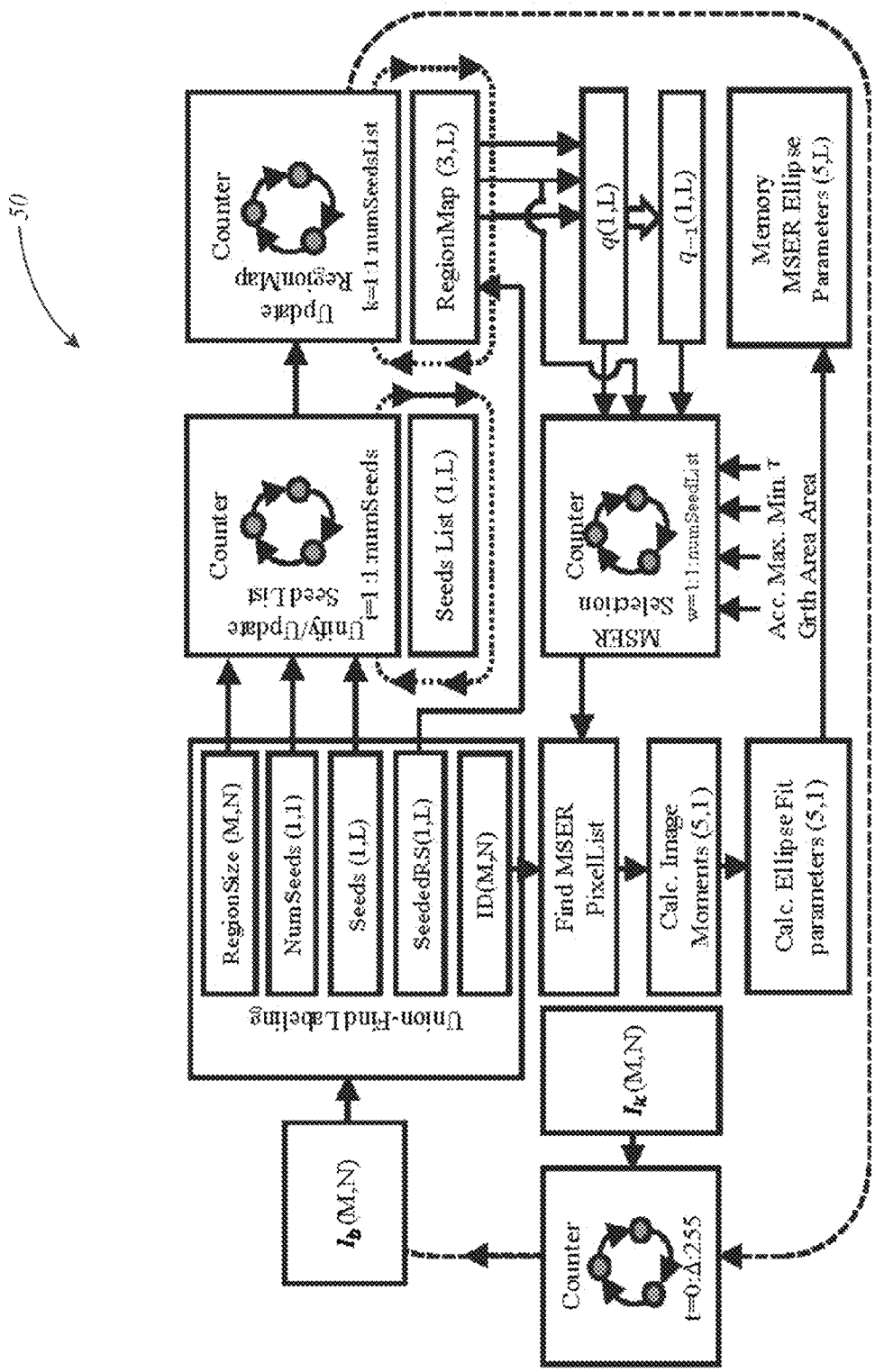
FIG. 6 is a schematic diagram illustrating an approach for processing a binary-threshold image to detect contiguous regions, in accordance with many embodiments.
Figure 7:
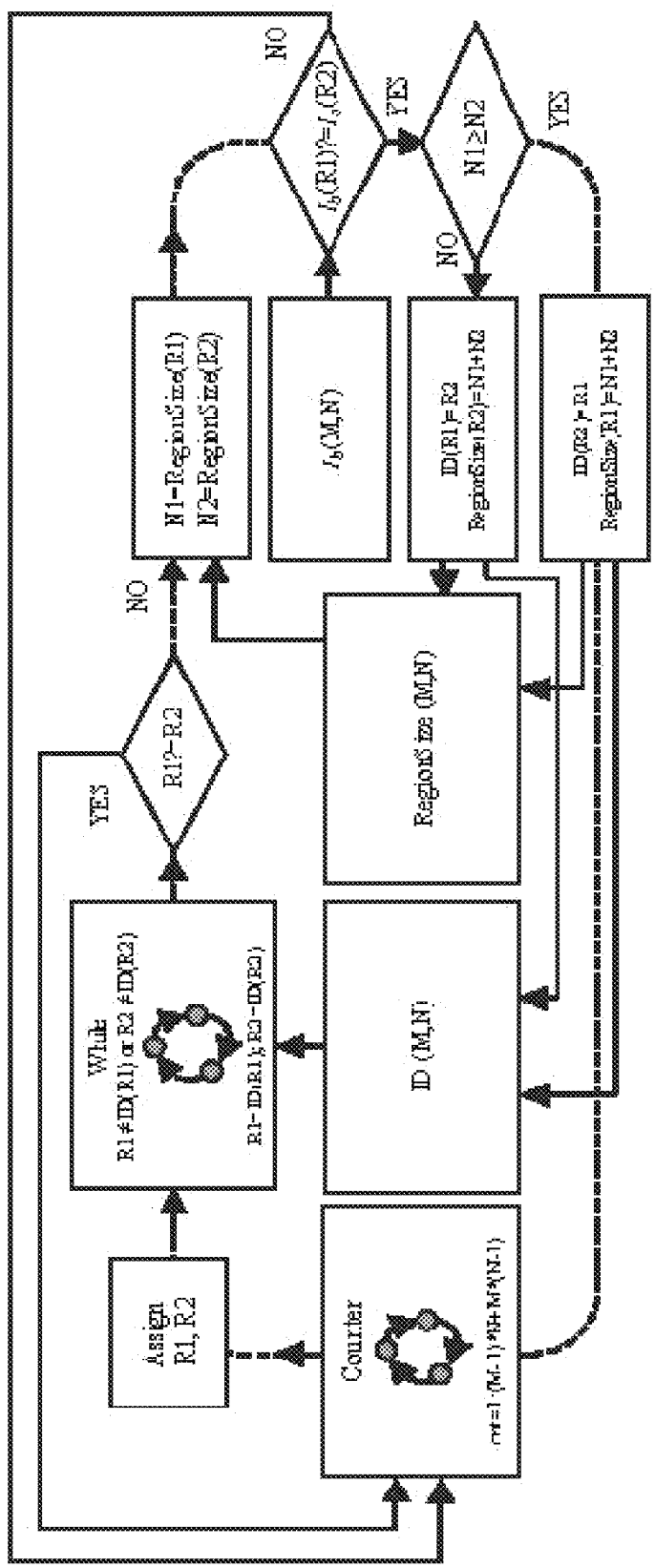
FIG. 7 is a schematic diagram illustrating an approach for detecting maximally stable extremal regions in intensity and depth images, in accordance with many embodiments.

FIG. 6 provides more detailed illustration of the method 50 for MSER detection, in accordance with many embodiments. The MSER detection can be accomplished, as described herein, using 255/Δ+1 thresholding processes to generate resulting binary threshold images. In the following discussion, reference is made to one threshold level, t. The MSER detection method 50 takes the intensity image, of size M×N, and threshold it resulting in an M×N binary threshold image. The binary threshold image is then passed to the Union-Find algorithm to carry out the white spot labeling and will result in a uniquely labeled regions that can be easily identified and hence used for the later MSER processing. The Union-Find Architecture is shown in FIG. 7.

Figure 8:
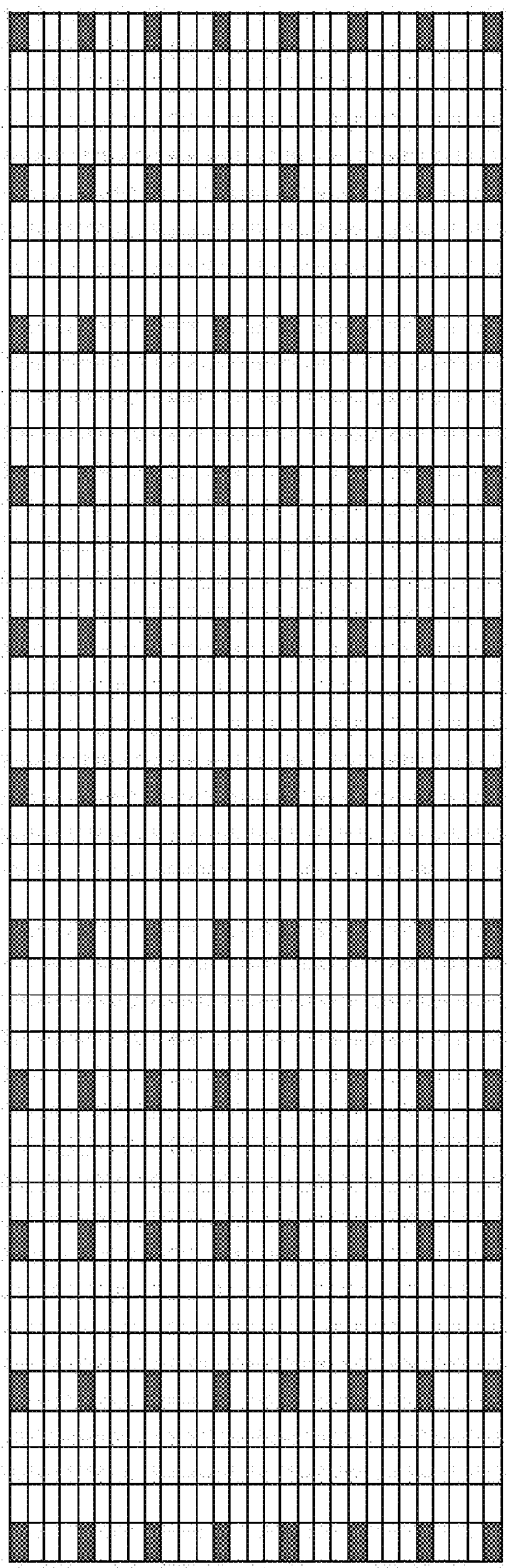
FIG. 8 illustrates a scanning approach for use in determining region sizes for identified extremal regions, in accordance with many embodiments.

The Union-Find algorithm has two stages of implementation. The first stage uses two M×N memories for the ID and RegionSize matrices. The ID matrix initially labels and assigns every non-zero pixel by an id value, and the RegionSize matrix is filled in these non-zero locations with ones, assuming initially that each pixel is an individual region and not connected to any other pixels. The Union-Find algorithm uses an iterative process. It can be shown that at most M×(N−1)+M×N iterations are sufficient to process all the pixels. Each region's roots are identified and the connected components belonging to every root are assigned the region root as their label. The sizes of the regions, maintained in RegionSize, are incremented to identify the number of pixels that have the same label. At the end of the iterative process, the ID matrix is a uniquely labeled image, and the RegionSize matrix has the size of each region stored at the same locations corresponding to the label of that region's root. In other words, the RegionSize matrix will end up being also labeled by the size of that region. The RegionSize matrix is different from the ID matrix in a major way in which it gets labeled by the sizes of the regions rather than the roots as in the ID matrix. The root is a unique label, while the region size is not, as two different regions might have the same region size, and virtually look connected if they share a boundary in the RegionSize matrix. The usefulness of using the ID and RegionSize matrices becomes evident in the second stage of our Union-Find implementation. Once the first stage is done, one final scan through the ID matrix, our uniquely labeled image, will be done to identify the regions' seeds. In this scanning, the architecture does not pass through all rows and columns, it passes through the one column and skips the next, for example β columns, and continues till it reaches the last column, and similarly for the rows, while storing the set of unique seeds, Seeds, and counting the seeds number. This scanning is illustrated in FIG. 8 for β=3.

The design approach has three main advantages. First, it helps in ignoring small labeled regions that are not that valuable for the MSER detector. Second, once the regions' seeds are identified, their region sizes can be directly located from the RegionSize memory, due to the analogy described earlier. Finally, the scanning speeds up the Union-Find by a factor of more than $\beta^2$, due to locations' skipping, enhancing the speed and the efficiency of the detection of the MSERs. The Union-Find algorithm outputs the labeled image, the detected seeds from scanning, the number of seeds, and their region sizes, defined respectively as ID, Seeds, NumSeeds, and SeedsRS.

At this stage, the current detected seeds, Seeds, are compared with the SeedsList stored from the earlier thresholds, i.e., from thresholds of values t−Δ, t−2Δ, . . . , Δ, 0. This step is used to unify and update the Seeds List, because of the region growing/merging effect, and the detection of new regions. Once the SeedsList gets updated, RegionMap is then filled with the corresponding seed region size from the SeedsRS memory from the Union-Find algorithm. Hence, utilizing [Q(t+Δ)], [Q(t)], and [Q(t−Δ)] stored in the RegionMap memory, the stability function, q(t), for the previous threshold can be calculated in the way described herein. MSERs are then selected by comparing the region size stored in the RegionMap's Q(t) row, with the MinArea and MaxArea MSER control parameters, and in a parallel fashion, q(t) is compared with the Acceptable Growth Rate value, while monitoring the nesting using the tolerance value, τ. The MSERs that get selected satisfy these control parameters. Then, those MSERs are identified by their seeds from the SeedsList, and all pixels coordinates that has the same label as these seeds, that can be identified using the ID memory, are passed to calculate their region's moments and hence their elliptical fit parameters. The elliptical fit parameters are then stored in a dedicated memory, being appended to previously stored elliptical fit parameters from previous thresholds. The entire process is then repeated until the final threshold value is reached.

Object Tracking

Figure 11:
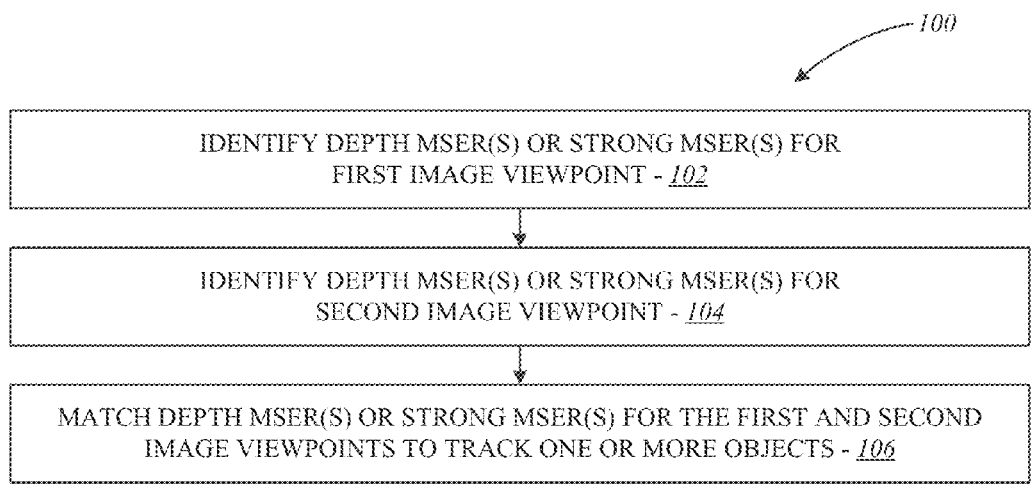
FIG. 11 is a simplified schematic diagram of acts of an approach for using depth data to track one or more objects, in accordance with many embodiments.
Figure 12:
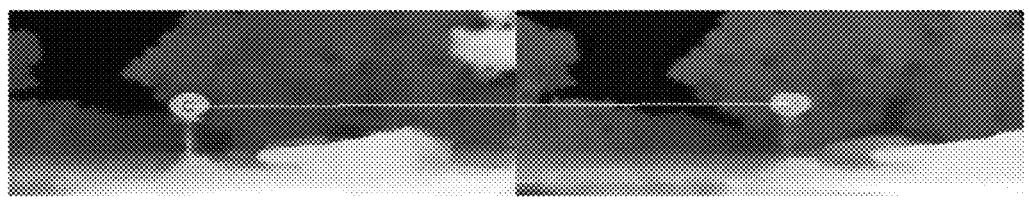
FIG. 12 illustrates an example detection of a stationary object in two different images of the object, in accordance with many embodiments.
Figure 13:
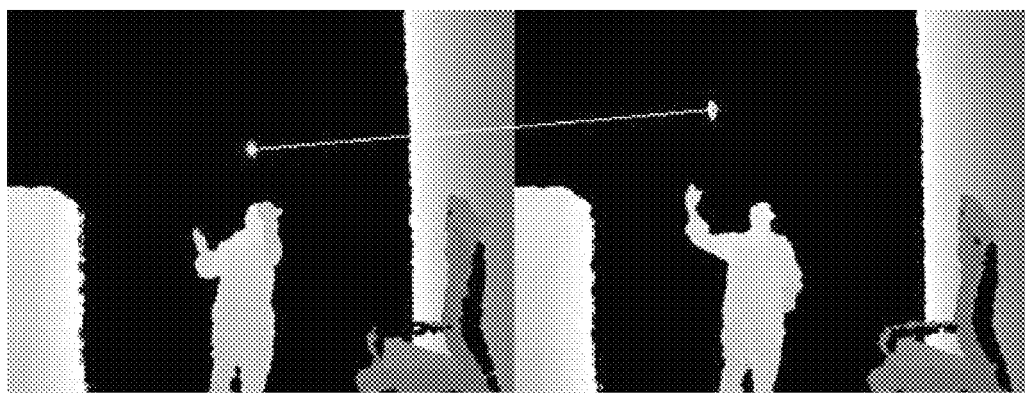
FIG. 13 illustrates an example detection of a single moving object, in accordance with many embodiments.
Figure 14:
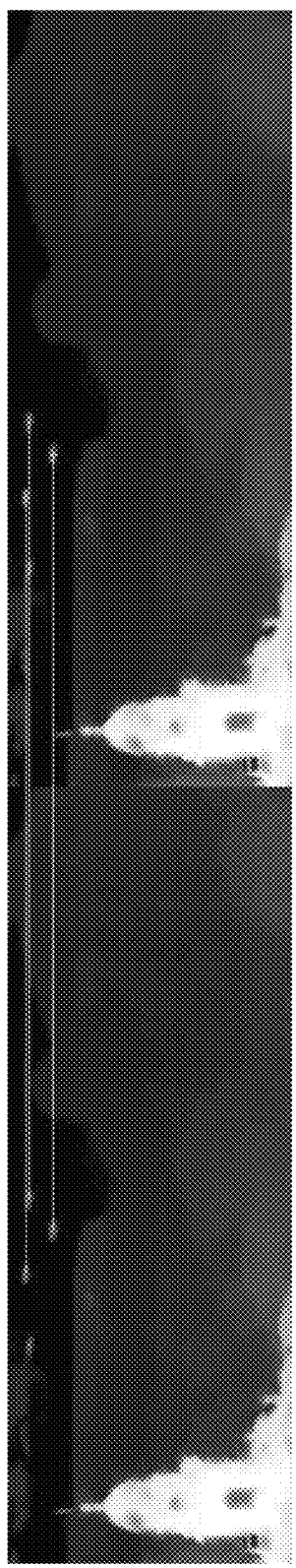
FIG. 14 illustrates an example detection of multiple moving objects, in accordance with many embodiments.

The approaches for detecting an object described herein can be used in any suitable approach for tracking one or more objects. For example, FIG. 11 shows acts of a method 100 for tracking one or more objects, in accordance with many embodiments. The method 100 includes identifying a depth MSER(s) or strong MSER(s) for a first image view point relative to one or more objects being tracked (act 102). A depth MSER(s) or strong MSER(s) is then determined for a second image viewpoint (act 104) relative to the one or more objects being tracked. The second image viewpoint can be the same as the first image view point where the one or more objects being tracked remain stationary, or different where the one or more objects being tracked are in motion. In act 106, the depth MSER(s) or the strong MSER(s) for the first and second image viewpoints are matched to track the one or more objects. FIG. 12 illustrates an example detection of a stationary object in two different images of the object. FIG. 13 illustrates an example detection of a single moving object. And FIG. 14 illustrates an example detection of multiple moving objects.

Systems

Figure 15:
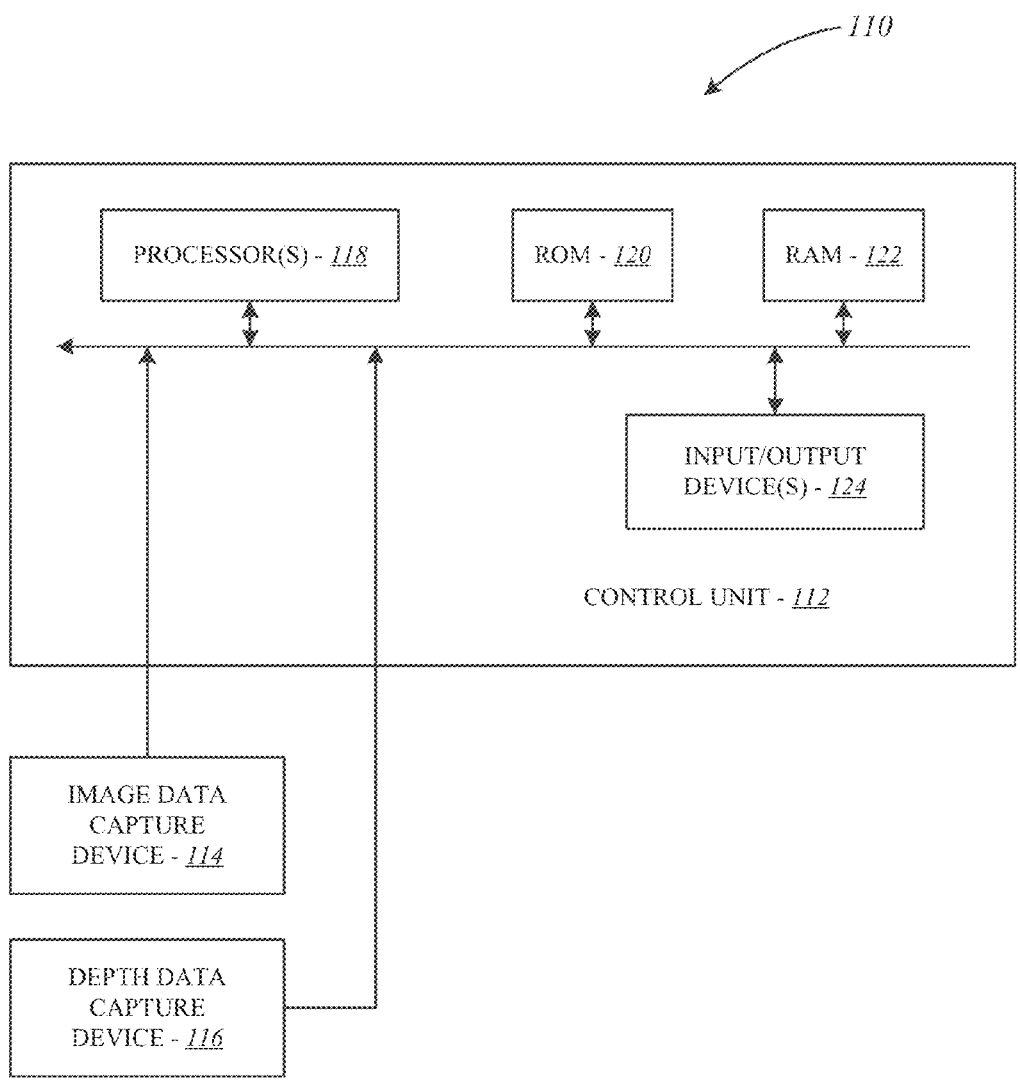
FIG. 15 is a simplified schematic diagram of a system for detecting and/or tracking one or more objects using depth data and/or image intensity data, in accordance with many embodiments.

The approaches described herein for detecting and/or tracking one or more objects can be implemented on any suitable system. For example, FIG. 15 schematically illustrates a system 110 that can be used to accomplish the approaches described herein for detecting and/or tracking one or more objects. The system 110 includes a control unit 112, an image data capture device 114, and a depth data capture device 116. Any suitable device can be used as the image capture device 114 (e.g., a digital camera, digital video recorder, etc.). Likewise, any suitable device can be used as the depth data capture device 116 (e.g., Microsoft Kinect sensor, Stereo-metric devices (that uses multiple cameras), and laser scanners). A single suitable device can be used in place of the image capture device 114 and the depth data capture device 116.

The control unit 112 includes one or more processors 118, read only memory (ROM) 120, random access memory (RAM) 122, one or more input/output devices 124, and a data bus 126. The ROM 120 can store basic operating system instructions executable by the one or more processors 118 to control basic operations of the control unit 112. The RAM 122 can store instructions executable by the one or more processors 118 to implement the approaches described herein for detecting and/or tracking one or more objects. The data bus 126 provides a communication channel interconnecting the one or more processors 118, the ROM 120, the RAM 122, the input/output devices (124), the image data capture device 114, and the depth data capture device 116. Any suitable type and number of the input/output device(s) 124 can be used including, but not limited to, a keyboard(s), a display(s), a mouse(s), etc.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of detecting one or more objects in image data, the method comprising:
    receiving depth image data for a single depth image having a depth image view point relative to the one or more objects;
    forming a series of binary threshold depth images from the depth image data, each of the series of binary threshold depth images being based on a respective depth, each of the series of binary threshold depth images including depth image pixels, each of the depth image pixels having either a first depth value or a second depth value based on the respective depth;
    for each of the series of binary depth threshold images, identifying one or more depth extremal regions in which the depth image pixels have first depth value; and
    selecting one or more depth maximally stable extremal regions from the identified depth extremal regions based on change in area of one or more respective depth extremal regions for different depths.

2. The method of claim 1, wherein forming the series of binary threshold depth images from the depth image data comprises:
    converting the depth image data into a depth image data intensity image; and
    forming each of the series of binary threshold depth images from the depth image data intensity image based on a respective intensity.

3. The method of claim 1, further comprising generating parameters descriptive of the one or more depth maximally stable extremal regions.

4. The method of claim 3, wherein the parameters define an ellipse approximating the respective depth maximally stable extremal region.

5. The method of claim 1, further comprising:
    receiving intensity image data for a single intensity image having an intensity image view point substantially the same as the depth image view point;
    forming a series of binary threshold intensity images from the intensity image data, each of the series of binary threshold intensity images being based on a respective intensity, each of the series of binary threshold intensity images including intensity image pixels, each of the intensity image pixels having either a first intensity value or a second intensity value based on the respective depth;
    for each of the series of binary intensity threshold images, identifying one or more intensity extremal regions in which the intensity image pixels have the first intensity value;
    selecting one or more intensity maximally stable extremal regions from the identified intensity extremal regions based on change in area of one or more respective intensity extremal regions for different intensities; and
    selecting one or more strong maximally stable extremal regions that are both a depth maximally stable extremal region and an intensity maximally stable extremal region.

6. The method of claim 5, wherein the depth image view point is the same as the intensity image view point.

7. The method of claim 5, further comprising generating parameters descriptive of the one or more strong maximally stable extremal regions.

8. The method of claim 7, wherein the parameters define an ellipse approximating the respective strong maximally stable extremal region.

9. A method for object tracking, the method comprising:
    receiving first depth image data for a single first depth image having a first depth image view point relative to an object;
    forming a series of binary threshold first depth images from the first depth image data, each of the binary threshold first depth images being based on a respective depth, each of the series of binary threshold first depth images including first depth image pixels, each of the first depth image pixels having either a first depth value or a second depth value based on the respective depth;

for each of the series of binary threshold first depth images, identifying one or more first depth extremal regions in which the first depth image pixels have the first depth value;

selecting one or more first depth maximally stable extremal regions from the identified first depth extremal regions based on change in area of one or more respective first depth extremal regions for different depths;

receiving second depth image data for a single second depth image having a second depth image view point relative to the object;

forming a series of binary threshold second depth images from the second depth image data, each of the series of binary threshold second depth images being based on a respective depth, each of the series of binary threshold second depth images including second depth image pixels, each of the second depth image pixels having either a third depth value or a fourth depth value based on the respective depth;

for each of the series of binary second depth threshold images, identifying one or more second depth extremal regions in which the second depth image pixels have the third depth value;

selecting one or more second depth maximally stable extremal regions from the identified second depth extremal regions based on change in area of one or more respective second depth extremal regions for different depths; and tracking the object based on the selected first and second depth maximally stable extremal regions by identifying one of the first depth maximally stable extremal regions and one of the second depth maximally stable regions corresponding to the object.

10. The method of claim 9, further comprising:

receiving first intensity image data for a single first intensity image having a first intensity image view point substantially the same as the first depth image view point;

forming a series of binary threshold first intensity images from the first intensity image data, each of the series of binary threshold first intensity images being based on a respective intensity, each of the series of binary threshold first intensity images including first intensity image pixels, each of the first intensity image pixels having either a first intensity value or a second intensity value based on the respective depth;

for each of the series of binary intensity first threshold images, identifying one or more first intensity extremal regions in which the first intensity image pixels have first intensity value;

selecting one or more first intensity maximally stable extremal regions from the identified first intensity extremal regions based on change in area of one or more respective first intensity extremal regions for different intensities;

selecting one or more first strong maximally stable extremal regions that are both a first depth maximally stable extremal region and a first intensity maximally stable extremal region;

receiving second intensity image data for a single second intensity image having a second intensity image view point substantially the same as the second depth image view point;

forming a series of binary threshold second intensity images from the second intensity image data, each of the series of binary threshold second intensity images being based on a respective intensity, each of the series of binary threshold second intensity images including second intensity image pixels, each of the second intensity image pixels having either a third intensity value or a fourth intensity value based on the respective depth;

for each of the series of binary threshold second intensity images, identifying one or more second intensity extremal regions in which the second intensity image pixels have the third intensity value;

selecting one or more second intensity maximally stable extremal regions from the identified second intensity extremal regions based on change in area of one or more respective second intensity extremal regions for different intensities; and selecting one or more second strong maximally stable extremal regions that are both a second depth maximally stable extremal region and a second intensity maximally stable extremal region, and wherein said tracking the object is based on the selected first and second strong maximally stable extremal regions by identifying one of the first strong maximally stable extremal regions and one of the second strong maximally stable regions corresponding to the object.

11. A system for detecting one or more objects in image data, the system comprising:

one or more processors; and a tangible memory storage device storing instructions that when executed by the one or more processors cause the system to:

receive depth image data for a single depth image having a depth image view point relative to the one or more objects;

form a series of binary threshold depth images from the depth image data, each of the binary threshold depth images being based on a respective depth, each of the binary threshold depth images including depth image pixels, each of the depth image pixels having either a first depth value or a second depth value based on the respective depth;

for each of the series of binary depth threshold images, identify one or more depth extremal regions in which the depth image pixels have the first depth value; and select one or more depth maximally stable extremal regions from the identified depth extremal regions based on change in area of one or more respective depth extremal regions for different depths.

12. The system of claim 11, wherein forming the series of binary threshold depth images from the depth image data comprises:

converting the depth image data into a depth image data intensity image; and forming each of the series of binary threshold depth images from the depth image data intensity image based on a respective intensity.

13. The system of claim 11, wherein the instructions, when executed, further cause the system to generate parameters descriptive of the one or more depth maximally stable extremal regions.

14. The system of claim 13, wherein the parameters define an ellipse approximating the respective depth maximally stable extremal region.

15. The system of claim 11, wherein the instructions, when executed, further cause the system to:
- receive intensity image data for a single intensity image having an intensity image view point substantially the same as the depth image view point;
- form a series of binary threshold intensity images from the intensity image data, each of the series of binary threshold intensity images being based on a respective intensity, each of the series of binary threshold intensity images including intensity image pixels, each of the intensity image pixels having either a first intensity value or a second intensity value based on the respective depth;
- for each of the series of binary intensity threshold images, identify one or more intensity extremal regions in which the intensity image pixels have the first intensity value;
- select one or more intensity maximally stable extremal regions from the identified intensity extremal regions based on change in area of one or more respective intensity extremal regions for different intensities; and
- select one or more strong maximally stable extremal regions that are both a depth maximally stable extremal region and an intensity maximally stable extremal region.

16. The system of claim 15, wherein the depth image view point is the same as the intensity image view point.

17. The system of claim 15, wherein the instruction, when executed by the one or more processors, further cause the system to generate parameters descriptive of the one or more strong maximally stable extremal regions.

18. The system of claim 17, wherein the parameters define an ellipse approximating the respective strong maximally stable extremal region.

19. A system for object tracking, the system comprising:
one or more processors; and
a tangible memory storage device storing instructions that when executed by the one or more processors cause the system to:
- receive first depth image data for a single first depth image having a first depth image view point relative to an object being tracked;
- form a series of binary threshold first depth images from the first depth image data, each of the series of binary threshold first depth images being based on a respective depth, each of the series of binary threshold first depth images including first depth image pixels, each of the first depth image pixels having either a first depth value or a second depth value based on the respective depth;
- for each of the binary threshold first depth images, identify one or more first depth extremal regions in which the first depth image pixels have the first depth value;
- select one or more first depth maximally stable extremal regions from the identified first depth extremal regions based on change in area of one or more respective first depth extremal regions for different depths;
- receive second depth image data for a single second depth image having a second depth image view point relative to an object being tracked;
- form a series of binary threshold second depth images from the second depth image data, each of the series of binary threshold second depth images being based on a respective depth, each of the series of binary threshold second depth images including second depth image pixels, each of the second depth image pixels having either a third depth value or a fourth depth value based on the respective depth;
- for each of the series of binary second depth threshold images, identify one or more second depth extremal regions in which the second depth image pixels have the third depth value;
- select one or more second depth maximally stable extremal regions from the identified second depth extremal regions based on change in area of one or more respective second depth extremal regions for different depths; and
- track an object based on the selected first and second depth maximally stable extremal regions by identifying one of the first depth maximally stable extremal regions and one of the second depth maximally stable regions corresponding to the object.

20. The system of claim 19, wherein the instructions, when executed by the one or more processors, cause the system to:
- receive first intensity image data for a single first intensity image having a first intensity image view point substantially the same as the first depth image view point;
- form a series of binary threshold first intensity images from the first intensity image data, each of the series of binary threshold first intensity images being based on a respective intensity, each of the series of binary threshold first intensity images including first intensity image pixels, each of the first intensity image pixels having either a first intensity value or a second intensity value based on the respective depth;
- for each of the series of binary intensity first threshold images, identify one or more first intensity extremal regions in which the first intensity image pixels have first intensity value;
- select one or more first intensity maximally stable extremal regions from the identified first intensity extremal regions based on change in area of one or more respective first intensity extremal regions for different intensities;
- select one or more first strong maximally stable extremal regions that are both a first depth maximally stable extremal region and a first intensity maximally stable extremal region;
- receive second intensity image data for a single second intensity image having a second intensity image view point substantially the same as the second depth image view point;
- form a series of binary threshold second intensity images from the second intensity image data, each of the series of binary threshold second intensity images being based on a respective intensity, each of the series of binary threshold second intensity images including second intensity image pixels, each of the second intensity image pixels having either a third intensity value or a fourth intensity value based on the respective depth;
- for each of the series of binary intensity second threshold images, identify one or more second intensity extremal regions in which the second intensity image pixels have the third intensity value;
- select one or more second intensity maximally stable extremal regions from the identified second intensity extremal regions based on change in area of one or more respective second intensity extremal regions for different intensities;

select one or more second strong maximally stable extremal regions that are both a second depth maximally stable extremal region and a second intensity maximally stable extremal region; and track the object based on the selected first and second strong maximally stable extremal regions by identifying one of the first strong maximally stable extremal regions and one of the second strong maximally stable regions corresponding to the object.

\* \* \* \* \*